Oct. 29, 1935.  C. G. MUNTERS  2,019,194
INSULATION, PARTICULARLY FOR REFRIGERATORS OR THE LIKE
Filed Jan. 25, 1934  2 Sheets-Sheet 1
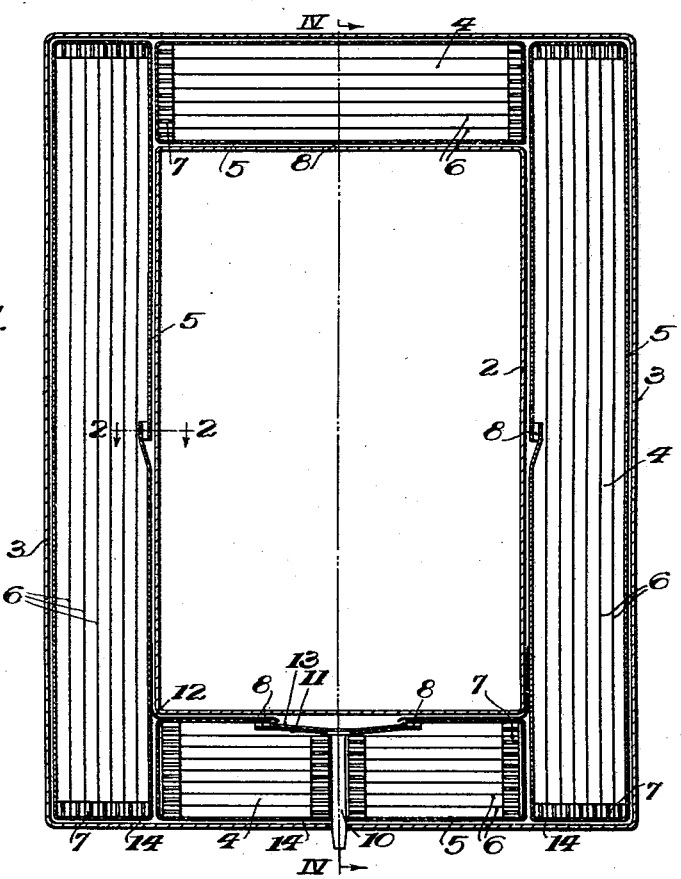
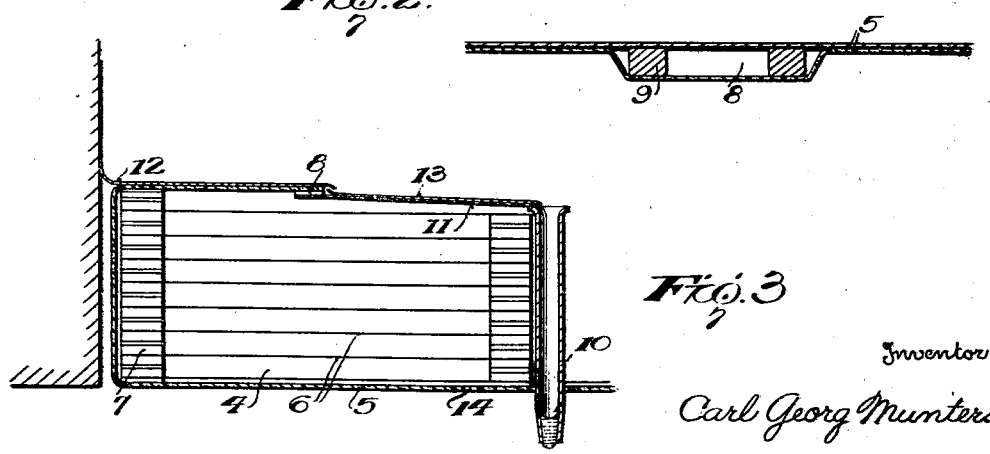
Inventor
Carl Georg Munters
By Cameron, Kerkam & Sutton.
Attorneys

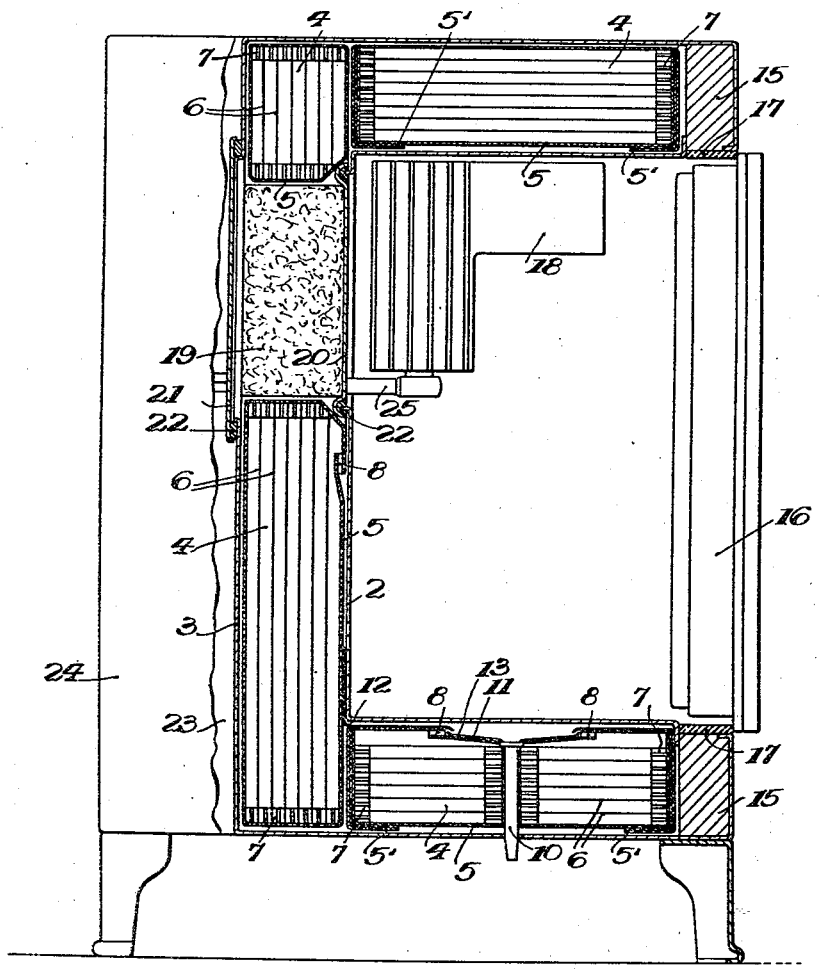

Patented Oct. 29, 1935

2,019,194

UNITED STATES PATENT OFFICE 2,019,194

INSULATION, PARTICULARLY FOR REFRIGERATORS OR THE LIKE

Carl Georg Munters, Stockholm, Sweden

Application January 25, 1934, Serial No. 708,324
In Sweden February 14, 1933

21 Claims. (Cl. 62—89)

The invention relates to methods of insulation and to insulating equipment, particularly for refrigerators or the like, which are designed to prevent the moisture of the air from precipitating at the interior of the insulation.

As is well known, atmospheric air almost always contains a certain amount of water vapor. This moisture of the air therefore has a partial pressure. If, at a given pressure, the corresponding temperature drops to a certain value (dew point), a portion of the moisture in the air is precipitated out when the latter is further cooled. Such precipitation of water can easily take place, for example, when atmospheric air penetrates into the insulation of a refrigerator, because the temperature of the latter is lower than that of the surrounding atmospheric air. A certain air interchange always takes place in an insulation consisting, for example, of sheets of fibrous or porous materials, by reason of the so-called respiration of the latter, which is caused by variations in barometric pressure and temperature. The atmospheric air thus penetrating into the insulation is cooled down therein, and, when the temperature of the air falls below the dew point, water is precipitated which, for several reasons, exerts an injurious influence on the insulation. When use is made of porous insulating material which is hygroscopic the water is sucked into the fibres, so that heat conduction is increased. Furthermore, the moisture precipitating in the insulation has a loosening and destructive action. When use is made of thin metallic layers, the precipitating moisture exerts a corrosive action, due to which the heat reflecting capacity of the sheets or foils is diminished.

In order to preclude these defects it has been proposed to provide the insulation with a coating of extremely dense, waterproof material, for example, tar. This, however, has been found inadequate, as it is practically imposible to make all the pores tight in this manner, with greatly varying barometric pressures.

In contrast to previous arrangements the present invention is essentially characterized in that the insulation is provided with a casing having an opening or openings for respiration, the opening or openings in said casing being so arranged that the air in passing thereto on its way to the insulating element is dried by being forced to pass cold surfaces or bodies, the temperature of which is lower than that of the surrounding atmospheric air. The moisture contained in the air is thereby precipitated before it passes into the interior of the insulation and the latter thus protected without it being necessary to seal it hermetically.

Further characteristics and objects of the present invention will be apparent from a consideration of the detailed description of the invention that follows. While only one embodiment of the invention has been described and illustrated in the accompanying drawings, it is to be expressly understood that these drawings are for the purpose of illustration only and are not to be construed as defining the scope of the invention, reference being had for the latter purpose to the appended claims.

In the drawings, wherein like reference characters indicate like parts throughout the several views:—

Fig. 1 is a somewhat diagrammatic longitudinal section through a refrigerator constructed in accordance with the invention;

Fig. 2 is a section on line II—II of Fig. 1 on enlarged scale;

Fig. 3 shows a portion of the lower wall of the refrigerator, likewise on enlarged scale; and Fig. 4 is a side view, part in section on line IV—IV of Fig. 1, showing the construction of Fig. 1 as applied to a practical form of refrigerator.

The refrigerator shown in the drawings consists of an inner receptacle 2 and an outer casing 3, both of which may suitably be made of sheet metal. The space between the walls 2 and 3 is provided with insulation 4 of any suitable character. In the embodiment illustrated, the insulation consists of an arrangement within a jacket 5 of plates 6 and spacers 7, for example of corrugated pulp board, which establish the spaced relations of the plates and which are applied in the form of a frame on the edges of the plates. The plates are preferably made of very thin material, for example aluminum foil, and are spaced apart in such manner as to minimize the existence of convective currents in the gas enclosed between them. The insulating plate bundles 4 thus formed are, as stated, encompassed by a jacket 5 which consists of a moisture-proof material, for example paper or pulp impregnated with oil, wax, linseed oil, paraffine, tar, asphalt products or the like. The jacket may be wrapped about the plate bundle and its folded edges 5' are preferably packed or attached by cementing or otherwise so that it encompasses the insulation in as nearly a gas-tight and moisture-proof manner as possible.

In accordance with the invention, the jacket 5 is provided with one or more openings 8 which are disposed preferably at or near the center of the long sides of the plate bundle and which, as shown on Fig. 2, may be formed by spacers 9 inserted between the overlapping edge portions of jacket 5. A drain pipe 10 is provided in the plate bundle insulating the lower part of the refrigerator, and the openings 8 of this bundle are disposed laterally of this pipe. The portion 11 of jacket 5 lying between openings 8 and drain pipe 10 is preferably slightly inclined relative to the pipe, in order to facilitate the discharge of the precipitated water. The lower opening of pipe 10 may be constricted, so that a liquid seal is formed (see Fig. 3).

As shown in Fig. 1, all of the ventilating openings 8 are directed toward the interior of the refrigerator. The air flowing to the plate bundles 4 must therefore pass by the cold inner wall 2 of the refrigerator before reaching openings 8, whereby the moisture in the air precipitates on this wall before the air enters openings 8. Respiration of the insulation, that is, the interchange of air on variation of the barometer level and the temperature, can thus take place without water precipitating at the interior of the insulation proper. The plate bundles are mounted at a suitable distance from the inner receptacle walls 2 so as to form a passage through which the air must pass before reaching venting openings 8. The temperature of these walls being lower than that of the insulation, it is apparent that the invention provides a very simple and reliable arrangement for preventing precipitation of moisture within the insulation itself.

In order to prevent the precipitated water from coming in contact with the lower plate bundle, sheet metal screens or plates 12, 13 are provided between the bottom portion of inner receptacle 2 and the adjacent plate bundles, and are so arranged as to collect and carry the water to pipe 10. Provided between screens 12 and 13 are openings through which the air flows before entering through openings 8 into the horizontal lower plate bundle.

The upright plate bundles are also provided with suitable means for preventing entry of the precipitated moisture into openings 8. As shown, this result is accomplished in a most simple manner by mutually overlapping the portion of jacket 5 forming the openings 8, as clearly shown on Fig. 1. A suitable protective shed or the like may also be provided above each opening, if desired. In the latter case special spacing members in the opening may be omitted.

In order to provide for such cases where, in spite of the means provided to prevent precipitation within the insulation, some water should collect therein after long periods of usage, some small discharge openings may be provided in the bottom faces of jackets 5 of the insulating elements 4, as shown at 14. These openings 14, which are formed by simple perforation with a needle or the like, are, however, so small as compared with openings 8 that air interchange can take place practically only through the latter, which offer considerably less resistance to the penetration of the air.

As shown in Fig. 4, in a practical embodiment of the invention the inner receptacle 2 forming the insulated cooling chamber of the refrigerator may be supported in its proper position within and at the same time insulated from outer casing 3 by attachment in any desired manner to a wooden frame 15 which backs the entire front wall of outer casing 3 and surrounds the opening provided for refrigerator door 16. The inner periphery of frame 15 may be lined, if desired, with strips 17 of bakelite or like insulating material to form a suitable frame for door 16.

The insulating plate bundle 4 adjacent the rear wall of inner receptacle 2 is preferably provided with a suitable opening therein through which the cooling unit 18 may be inserted in and withdrawn from the inner receptacle 2, and with a plate or block 19 of cork or other insulating material for closing said opening when the refrigerator is assembled. The corresponding openings in the walls of inner receptacle 2 and outer casing 3 may be closed by plates 20 and 21, respectively, each of which may be provided with a suitable gasket 22 of rubber or the like. The space 23 between the rear wall of outer casing 3 and the outer cabinet 24 is adapted to house the refrigerating apparatus which is connected to and serves cooling unit 18 through conduit 25.

There is thus provided by the present invention both a novel method and a simple structural form of insulation for refrigerators which effectually prevent the precipitation of moisture therein without the necessity for employing hermetic sealing or other relatively expensive and less efficient expedients.

It is obvious that the invention is not limited to the structure shown in the drawings, but is capable of a variety of mechanical embodiments, including various changes in the form, details of construction and arrangement of the parts, all of which will now appear to those skilled in the art and may be employed without departing from the spirit of the invention. The invention is also of equal utility where by reason of a leak or opening provided the flow of air into and out of the insulation is always in the same direction as distinguished from the respiratory action under changes of barometric pressure heretofore referred to. Reference is therefore to be had to the appended claims for a definition of the scope of the inventive concept.

What is claimed is:

1. In combination with the external walls of a refrigerator and internal walls forming a cooling chamber, said internal walls being spaced from said external walls to provide an intermediate insulation space, insulating means within said space including insulating material and a jacket surrounding said insulating material, said jacket having one or more passages in its wall to permit a change of air within said insulating means and opening into said insulation space adjacent a relatively cold wall of said cooling chamber.

2. In combination with the external walls of a refrigerator and internal walls forming a cooling chamber, said internal walls being spaced from said external walls to provide an intermediate insulation space, insulating means within said space including insulating material and a jacket surrounding said insulating material, said insulating means being spaced from a relatively cold wall of said cooling chamber to provide an air passage therebetween and said jacket having one or more passages in its wall opening into the passage between said jacket and the cold wall of said cooling chamber whereby air flowing into said jacket through said passages is first dehydrated by contact with said relatively cold wall.

3. In combination with the external walls of a refrigerator and internal walls forming a cooling chamber, said internal walls being spaced from said external walls to provide an intermediate insulation space, insulating means within said space including insulating material and a jacket surrounding said insulating material, said jacket having one or more passages in its wall to permit a change of air within said insulating means, said passages opening into said insulation space adjacent a relatively cold wall of said cooling chamber and being so constructed and arranged that moisture precipitated from the air by contact with said cold wall is prevented from entering the same.

4. In combination with the external walls of a refrigerator and internal walls forming a cooling chamber, said internal walls being spaced from said external walls to provide an intermediate insulation space, insulating means within said space including insulating material and a jacket surrounding said insulating material, said jacket having one or more passages in its wall to permit a change of air within said insulating means and opening into said insulation space adjacent a relatively cold wall of said cooling chamber, and means for collecting and discharging the moisture precipitated on said cold surface from the air flowing to said insulating means.

5. In combination with the external walls of a refrigerator and internal walls forming a cooling chamber, said internal walls being spaced from said external walls to provide an intermediate insulation space, insulating means within said space including insulating material and a jacket surrounding said insulating material, said insulating means comprising a plurality of sheets spaced in the direction of heat transfer and providing intermediate air chambers, and said jacket consisting of moisture-impermeable material enclosing said sheets and air chambers, said jacket having one or more respiratory passages in its wall to permit a change of air within said insulating means and receiving air through a refrigerated passage.

6. In combination with the external walls of a refrigerator and internal walls forming a cooling chamber, said internal walls being spaced from said external walls to provide an intermediate insulation space, insulating means within said space and including insulating material and a jacket surrounding said insulating material, said insulating means comprising a plurality of sheets spaced in the direction of heat transfer providing intermediate air chambers, and said jacket consisting of moisture-impermeable material enclosing said sheets and chambers, said jacket being spaced from the wall of said cooling chamber to provide an air passage therebetween and having one or more respiratory openings in its wall opening into said air passage.

7. In combination with the exterior walls of a refrigerator and interior walls providing an internal cooling chamber, said internal and external walls being spaced to provide an intermediate insulation space, insulating means within said insulation space comprising a plurality of insulating elements disposed about the top, bottom and sides of said cooling chamber, each of said insulating elements comprising insulating material enclosed in a moisture-impermeable jacket having one or more respiratory passages opening through the wall of said jacket adjacent a relatively cold wall of said cooling chamber.

8. In combination with the exterior walls of a refrigerator and interior walls providing an internal cooling chamber, said internal and external walls being spaced to provide an intermediate insulation space, insulating means within said insulation space comprising a plurality of insulating elements disposed about the top, bottom and sides of said cooling chamber, each of said insulating elements comprising insulating material enclosed in a moisture-impermeable jacket and being spaced from a wall of said cooling chamber to provide an air passage therebetween and each of said jackets having in the wall thereof one or more respiratory passages opening into the passage between the wall of said jacket and the wall of said cooling chamber.

9. In combination with the exterior walls of a refrigerator and interior walls providing an internal cooling chamber, said internal and external walls being spaced to provide an intermediate insulation space, insulating means within said insulation space comprising a plurality of insulating elements disposed about the top, bottom and sides of said cooling chamber, each of said insulating elements comprising insulating material enclosed in a moisture-impermeable jacket and being spaced from a wall of said cooling chamber to provide an air passage therebetween and each of said jackets having in the wall thereof one or more respiratory passages opening into the passage between the wall of said jacket and the wall of said cooling chamber, and means for collecting and draining the moisture precipitated in the several passages between said jackets and the walls of said cooling chamber.

10. In combination with the exterior walls of a refrigerator and interior walls providing an internal cooling chamber, said internal and external walls being spaced to provide an intermediate insulation space, insulating means within said insulation space comprising a plurality of insulating elements disposed about the top, bottom and sides of said cooling chamber, each of said insulating elements comprising insulating material enclosed in a moisture-impermeable jacket and being spaced from a wall of said cooling chamber to provide an air passage therebetween and each of said jackets having in the wall thereof one or more respiratory passages opening into the passage between the wall of said jacket and the wall of said cooling chamber, means for collecting the moisture precipitated on the walls of said cooling chamber, and a drain pipe passing therefrom through the insulating element disposed beneath said cooling chamber.

11. In combination with the exterior walls of a refrigerator and interior walls providing an internal cooling chamber, said internal and external walls being spaced to provide an intermediate insulation space, insulating means within said insulation space comprising a plurality of insulating elements disposed about the top, bottom and sides of said cooling chamber, each of said insulating elements comprising insulating material enclosed in a moisture-impermeable jacket and being spaced from a wall of said cooling chamber to provide an air passage therebetween and each of said jackets having in the wall thereof one or more respiratory passages opening into the passage between the wall of said jacket and the wall of said cooling chamber, moisture collecting plates disposed between said insulating elements and the walls of said cooling chamber, and means for discharging the moisture collected by said plates.

12. In combination with the external walls of a refrigerator and internal walls forming a cooling chamber, said internal walls being spaced from said external walls to provide an intermediate insulation space, insulating means within said space including insulating material enclosed in a surrounding jacket, said jacket having one or more passages in its wall to permit a change of air within said insulating means and opening into said insulation space adjacent a relatively cold wall of said cooling chamber, and a non-respiratory opening of relatively smaller size than the respiratory passage formed in the bottom wall of said jacket to drain therefrom any moisture precipitated within the insulating element.

13. In combination with the external walls of a refrigerator and internal walls forming a cooling chamber, said internal walls being spaced from said external walls to provide an intermediate insulation space, insulating means within said space including insulating material enclosed in a surrounding jacket, said jacket having one or more passages therein to permit a change of air within said insulating means and opening into said insulation space adjacent a relatively cold wall of said cooling chamber, and means for collecting moisture precipitated on the relatively cold wall of said cooling chamber including a drain pipe constricted to form a seal at its outlet end.

14. In combination with the external and internal walls of heat insulating equipment, said walls being spaced to provide an insulation space therebetween, means whereby one of said walls is maintained relatively cold as compared with the other of said walls, and insulating means within said insulation space, said insulating means including insulating material enclosed in a moisture-proof jacket and having one or more respiratory passages in the wall of said jacket opening into said insulation space adjacent said relatively cold wall.

15. In combination with the external and internal walls of heat insulating equipment, said walls being spaced to provide an insulation space therebetween, means whereby one of said walls is maintained relatively cold as compared with the other of said walls, and insulating means within said insulating space, said insulating means including a plurality of sheets spaced in the direction of heat transfer and providing intermediate air chambers, and a jacket of moisture-impermeable material enclosing said sheets and chambers, said jacket having in its wall one or more respiratory passages opening into said insulation space adjacent said relatively cold wall.

16. In combination with the external and internal walls of heat insulating equipment, said walls being spaced to provide an insulation space therebetween, means whereby one of said walls is maintained relatively cold as compared to the other of said walls, and insulating means within said insulation space, said insulating means including insulating material enclosed in a moisture-impermeable jacket disposed within said insulation space and spaced from said relatively cold wall to provide an air passage therebetween, and one or more respiratory passages in the wall of said jacket opening into said air passage.

17. In a refrigerator, a wall structure providing a space to be cooled and including insulation, a jacket of moisture-proof pliable material surrounding said insulation and having one or more apertures therein, and rigid wall members surrounding said jacket.

18. In a refrigerator, a wall structure providing a space to be cooled and including insulation and a jacket of pliable material surrounding said insulation, said jacket being sealed against air leakage throughout substantially its entire surface and provided with one or more apertures so arranged that air may flow into said insulation through said apertures, and means to cool air passing to said apertures.

19. The combination with spaced walls to be maintained at different temperatures of insulation therebetween comprising insulating material, and a jacket surrounding said material, said jacket being sealed to keep air from passing therethrough throughout substantially its entire surface and provided with one or more predetermined air flow apertures such that air flowing toward the interior of the jacket is cooler than air within said casing whereby moisture precipitable from the air flowing into the jacket is precipitated before the air reaches the interior of the jacket.

20. In a refrigerator, a rigid liner bounding a food space and forming the inner wall of an insulation space, a rigid outer casing forming the outside wall of the insulation space, means to cool the food space whereby the liner is colder than the outer casing, and insulating means in said insulation space including moisture-impermeable sheet material separate from and adjacent the warm outer casing and less rigid than the material of the outer casing and sealed against flow of air into the insulating means, and said insulating means having one or more respiratory passages associated with the part thereof adjacent the food space.

21. Heat insulating cabinet construction comprising spaced walls, insulation between said spaced walls, means for maintaining one of said walls at a temperature lower than the other wall, said insulation being sealed against breathing adjacent the wall of higher temperature but having means to permit breathing adjacent the wall of lower temperature whereby air coming in contact with the cold wall will be dried before being breathed into said insulation.

CARL GEORG MUNTERS.